United States Patent

McMeekin et al.

[15] 3,658,221

[45] Apr. 25, 1972

[54] APPARATUS FOR THE FIBRILLATION OF FILMS OF SYNTHETIC RESINS

[72] Inventors: Samuel McMeekin, Drumbeg, Belfast, Northern Ireland; Jan Dekker, Delft, Netherlands

[73] Assignee: Shell Oil Company, New York, N.Y.

[22] Filed: Oct. 15, 1969

[21] Appl. No.: 9,465

[30] Foreign Application Priority Data

Oct. 15, 1968 Great Britain......................48,868/68

[52] U.S. Cl..................................................225/97, 83/660
[51] Int. Cl. ..............................................................B26f 1/24
[58] Field of Search........................225/3, 97, 93; 28/DIG. 1; 57/31; 83/660, 2

[56] References Cited

UNITED STATES PATENTS

| 3,474,611 | 10/1969 | Suzuki et al..........................225/97 X |
| 3,273,771 | 9/1966 | Beaumont................................225/3 |
| 1,726,611 | 9/1929 | Cook ..................................83/660 X |
| 3,302,501 | 2/1967 | Greene .......................................83/2 |
| 3,369,435 | 2/1968 | Boultinghouse ....................83/660 X |
| 3,460,416 | 8/1969 | Gilbert................................83/660 X |
| 3,496,259 | 2/1970 | Guenther..............................225/3 X |
| 3,526,349 | 9/1970 | Moro.....................................225/97 |

Primary Examiner—Frank T. Yost
Attorney—Philip D. Freedman and Joseph W. Brown

[57] ABSTRACT

Thermoplastic films are fibrillated by passing longitudinally oriented film strips in an arcuate path over a roll which is rotating in the same direction as and faster than the motion of the strip and which is provided with rows of rearwardly inclined pins, the angularity of the pins being preferably adjustable.

8 Claims, 5 Drawing Figures

INVENTORS:
SAMUEL McMEEKIN
JAN DEEKER
BY: *Martin S. Baer*

THEIR ATTORNEY

INVENTORS:
SAMUEL McMEEKIN
JAN DEEKER
BY: *Martin S. Baer*
THEIR ATTORNEY

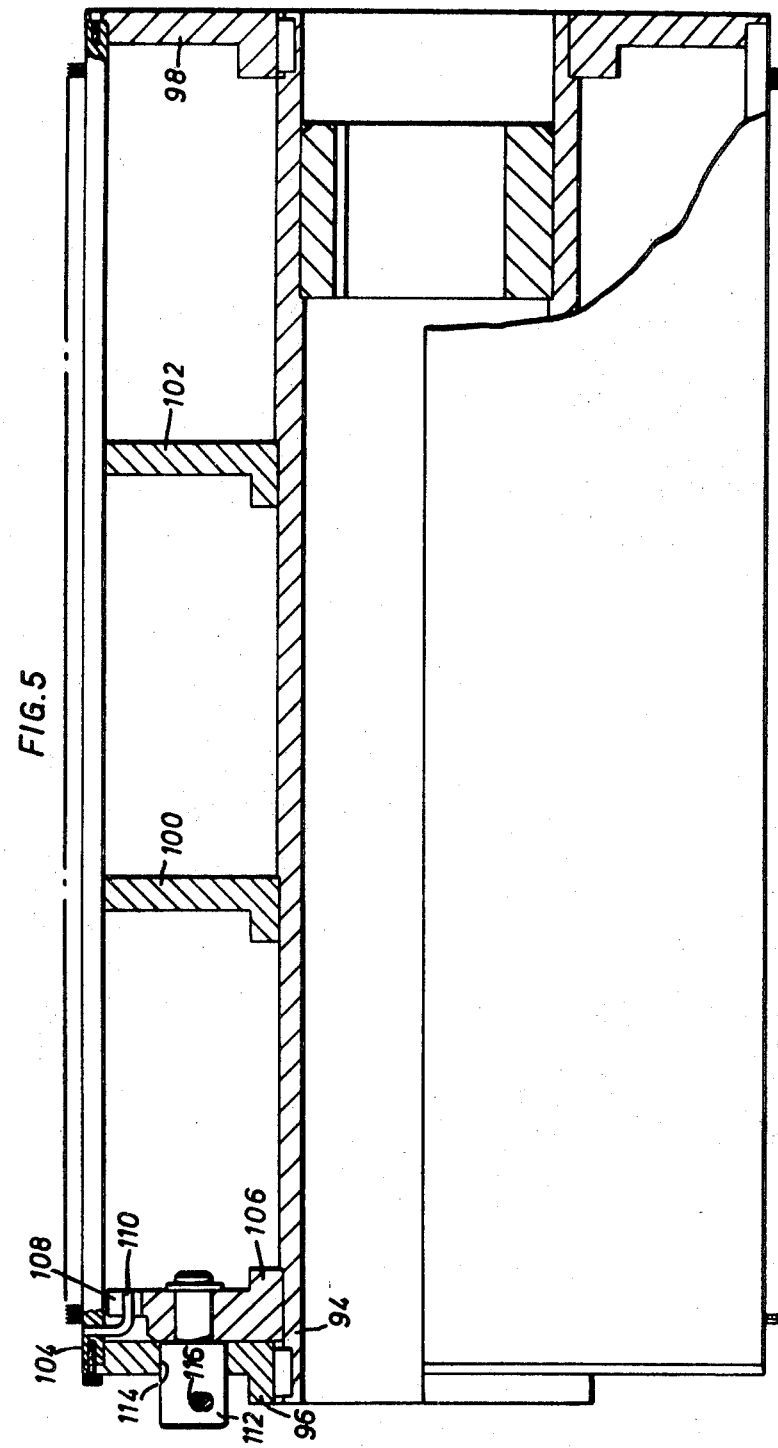
INVENTORS:
SAMUEL McMEEKIN
JAN DEKKER
BY: Martin S. Baer
THEIR ATTORNEY

APPARATUS FOR THE FIBRILLATION OF FILMS OF SYNTHETIC RESINS

The invention concerns the manufacture of fibrous textile material from films of synthetic thermoplastic resins by the so-called fibrillation route, that is to say by a route which involves the steps of stretching the film so that it is oriented in a longitudinal direction to such an extent that its strength in that direction is increased to a value adequate for textile purposes whilst its strength in a transverse direction is reduced to such an extent that working, especially mechanical working, will cause the film to develop into a structure of interconnected fibres. The terms "textile material" and "textile purpose" are intended to be understood quite broadly. For instance the textile materials will comprise, for example, silver, yarns, fibres, twine, and cord.

The principal object of the present invention is to provide a method and apparatus whereby a film of synthetic thermoplastic resin may be converted in a convenient and economical manner to multifilament or staple fibres which are particularly suitable for further processing for textile applications.

According to the present invention a process for the manufacture of fibrous products from a film of synthetic thermoplastic resin which has been oriented longitudinally in the manner previously described includes the steps of passing the stretched film under tension and in an arcuate path over the periphery of a roll which is rotating in the same direction at the contact area as, and at a peripheral speed greater than the linear speed of, the film, so that successive portions thereof are subjected simultaneously to the fibrillating action of a plurality of rows of pins, projecting from the periphery of said roll, the rows being parallel to the roll axis and the pins, from base to tip, being rearwardly inclined to the direction of the roll radius.

Films made from any fibrillatable thermoplastic resin material, i.e. material which in the form of a web acquires molecular orientation by stretching, may be used as starting material, for example homo- and copolymers of vinyl chloride, vinylidene chloride, vinyl acetate, acrylonitrile, as well as polyesters and polyamides. Preferred film-forming materials are homo- and copolymers of pivalolactone and lower monoolefins, polypropylene and low pressure polyethylene being particularly preferred.

The thickness of the films suitably employed in the present process may vary greatly, dependent on the desired denier of the fibrillate. The thickness of the film is usually between 10 and 1,000 microns and preferably between 10 and 250 microns. Generally the stretching is carried out at elevated temperatures using stretch ratios between 1 : 6 and 1 : 13. For polypropylene, suitable stretch ratios range from 1 : 8 and 1 : 10.

In operating the present process pin rows equi-spaced over the periphery of the roll are usually employed. A distance between successive rows of 5 – 10 mm is particularly suitable. In general the density of the pins in each row is at least 8 per cm and preferably 12 – 16 per cm. The effective pin length, i.e. the length of the protrusion beyond the periphery of the rotating roll, may vary considerably; a pin length between 2 and 7 mm gives particularly good results. A pin angle, being defined as the angle of inclination of the pins, from base to tip, to the direction of the roll radius, of 20° – 50° is preferably used.

The angle of contact between the film and the roll periphery is usually greater than 20°. A contact angle of from 30° to 100° is generally preferred. Under conditions within the ranges indicated above the present process leads to a fibrous product having particularly attractive properties and a structure which may vary considerably. In general a highly irregular network of interconnected filaments is obtained. In some cases the interconnections occur so rarely that by spreading out a sliver of the obtained fibrillate the interconnections separate from at least one of their stems, so that the "network" dissolves to give substantially hairy multifilament fibres.

The invention also comprises fibrous products produced by the said process and textile materials made therefrom.

Also according to the present invention an apparatus for the manufacture of fibrous products from a film of synthetic thermoplastic resin which has been oriented longitudinally in the manner previously described comprises a roll having a plurality of rows of pins, projecting from the periphery of said roll, parallel to the roll axis, and the pins, from base to tip, being rearwardly inclined to the direction of the roll axis; means for rotating said roll at a selected peripheral speed, and means for continuously travelling the film under tension over the periphery of the roll in an arcuate path of an extent which embraces a plurality of rows of pins and at a linear speed less than the peripheral speed of the roll.

A preferred embodiment of the apparatus is one in which the rows of pins are situated at a distance between successive rows ranging from 5 to 10 mm. Preferably the pins are close to each other. A pin density of at least 8 per cm, and preferably of from 12 to 16 per cm, has been found advantageous. Preferably the pins have an effective length between 2 and 7 mm, whilst a pin inclination of from 20° to 40° is particularly suitable.

The apparatus of the invention may comprise pins which, in the pattern as described above, are integrally joined to the roll surface. However, since the pins are normally subject to abrasion it is preferred to use a roll provided with replaceable members on which one or more straight rows of pins are mounted. A preferred embodiment of the present apparatus comprises means for fixing in preselected positions on the periphery of the roll a plurality of bars having cross-sections which are substantially constant along their length and lengthwise provided with at least one substantially straight row of pins. In such embodiment the surface of the roll is suitably provided with a plurality of grooves of substantially constant cross-section, parallel to the roll axis, each extending over the whole length of the roll and adapted to receive one of the pinned bars by insertion of at least a portion of the bar in a direction parallel to the roll axis. Particularly suitable are rods having a substantially round cross-section, each provided with one row of pins whilst rods which are rotatably adjustable about their axis are preferred. For continuous operations means for varying the inclination of all pins simultaneously is particularly advantageous.

Preferably the present apparatus comprises a lay-on roll in contrarotating and closely spaced relationship with the periphery of the pinned roll and which is rotatably adjustable about the axis of the pinned roll. It is found advantageous if the apparatus comprises at least one bar in closely spaced relationship with the periphery of the pinned roll, the bar being in fixed but adjustable position parallel to the pinned roll axis. In such case the bar or bars suitably have a substantially rectangular cross-section. In many cases it is particularly suitable if the bar or bars are rotatably adjustable about the axis of the pinned roll.

The present apparatus is most advantageous if it is made part of a continuous production line. Therefore the invention also encompasses machinery suitable for use in the manufacture of textile materials, which includes an apparatus, a linear or annular slit die extruder, a stretching unit comprising means for stretching film, and means for transporting film. If staple fibres or textile material derived therefrom are desired, the machinery may suitably include means for cutting the fibrillate to the desired staple length. However, in such cases it is of particular advantage in view of the properties of the fibrillate to incorporate a stretch-breaking unit for stretch-breaking the fibrillate instead of cutting it. Accordingly, in such cases the present machinery preferably includes a stretch-breaking unit comprising means for stretch-breaking film fibrillate, and means for transporting such fibrillate.

The invention will now be described further by way of example only with reference to the accompanying drawings in which:

FIG. 5 is an elevation corresponding to FIG. 4, also partly in section.

Figure 1:
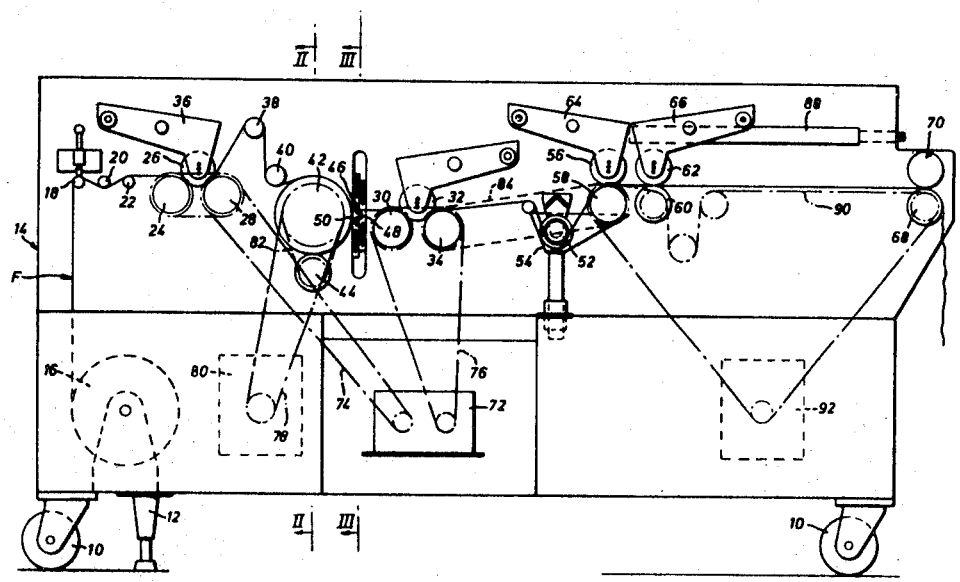
FIG. 1 is an elevation of machinery according to the invention.
Figure 2:
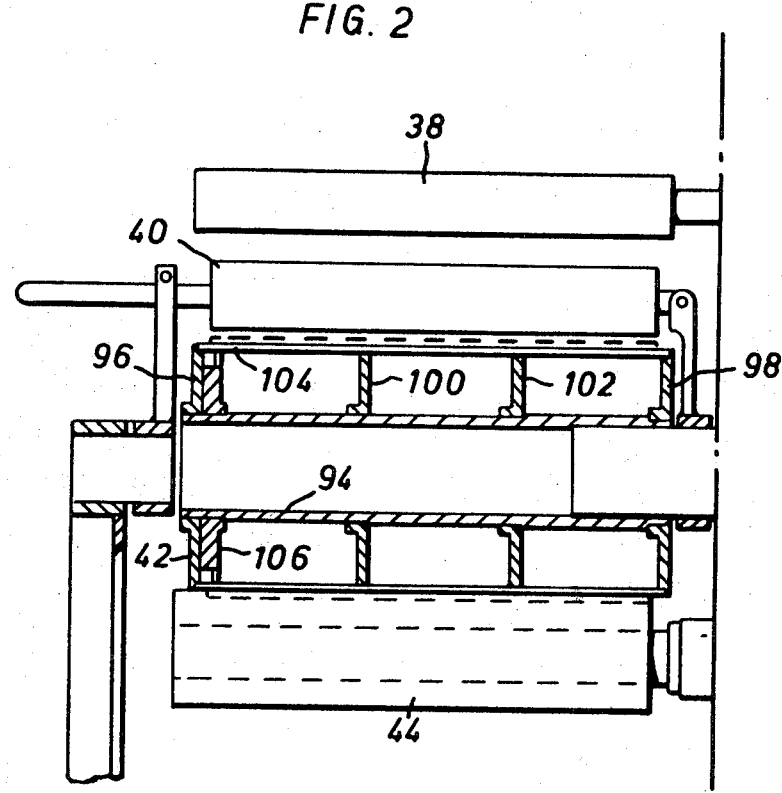
FIG. 2 is a sectional end view on the line II—II of FIG. 1.
Figure 3:
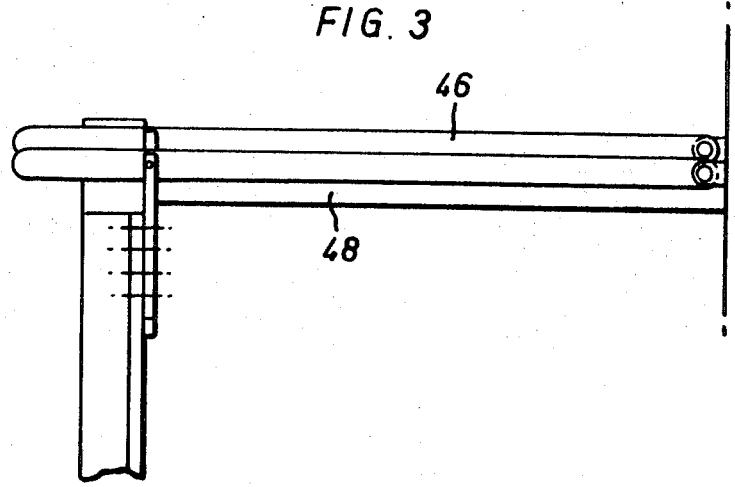
FIG. 3 is a sectional end view on the line III—III of FIG. 1.

Referring first to FIGS. 1 to 3, machinery comprising the fibrillating apparatus and inter alia a stretch-breaker is supported for mobility on castors 10, but extendable legs 12 (one only being shown) are provided so that the unit may be supported, firmly thereon as required.

A suitable superstructure 14 carries the operative elements of the unit. These consist essentially of a series of rolls and bars over which the film to be processed passes and a number of drive means for certain of the rolls.

The various rolls and bars will next be described with reference to the travel of the film F thereover.

A supply roll 16 of stretched film derived from a slit die extruder and longitudinally oriented in a stretching unit using a temperature of 140° C (extruder and stretching unit not shown) is supported at the lower left hand end of the apparatus as illustrated in FIG. 1. The film F passes upwardly therefrom and then in a substantially horizontal direction over a series of three tensioning bars 18, 20, 22. Over the next part of travel of the film F the tension in the film F is controlled by a series of three input nip rolls 24, 26, 28 and a series of three output nip rolls 30, 32, 34. The upper roll 26, 32 of each series is mounted in a support 36 which can be pivoted upwardly away from the other two rolls of the respective series to facilitate the threading of the film therethrough. Between the input nip rolls and the output nip rolls the film passes first over an idler roll 38, then beneath a lay-on roll 40, over a segment of the periphery of a fibrillating roll 42 (to be described in more detail hereafter) beneath which is disposed a brush roll 44 and finally through a series of bars 46, 48, 50. On emerging from the output nip rolls 30, 32, 34 the film passes beneath an applicator roll 52 which causes it to move through a trough 54 which is adjustable in height and which may contain a suitable finish liquid. On emerging from the trough 54 the film then passes through a stretch breaking zone defined by two pairs of stretch breaking rolls 56, 58 and 60, 62. As in the case of the input and output nip rolls the upper roll of each pair is mounted in a support 64, 66 by means of which the upper roll 56, 60 may be pivoted upwardly and away from the lower roll 58, 62 to facilitate threading of the film F through the stretch breaking zone. The second pair of stretch breaking rolls 60, 62 is carried by a plate 86 adjustable by a lead screw 88 to vary the reach. After passing through the stretch breaking zone the film travels through a pair of feed rolls 68, 70 from which it passes to suitable collection means (not shown). Certain of the rolls which have been described are positively driven whilst other are driven frictionally by contact with one or more of the driven rolls, and yet others are simply idler rolls.

The lower pairs 24, 28 and 30, 34 of each of the series of input and output nip rolls are driven by a suitable electric motor through separate infinitely variable gears contained in a housing 72. Transmission is by means of chains 74, 76. By this means the relative speeds of the input and output nip rolls can be varied whereby appropriately to tension the film passing through the fibrillating zone. The upper roll 26, 30 of each series is frictionally driven by virtue of its contact with the two lower rolls.

The fibrillating roll 42 is driven by chain 78 from an electric motor 80 and the brush roll 44 by an auxiliary chain drive 82 from the fibrillating roll 42. The lower roll 58 of the first pair of stretch breaking rolls is driven by an auxiliary chain drive 84 from the last roll 34 of the series of output nip rolls and at the same speed as that roll.

The upper roll 56 is in frictional contact with the lower roll 58.

The lower roll 60 of the second pair of stretch breaking rolls and the lower feed roll 68 are all driven by a chain drive 90 by an electric motor 92. The upper feed roll 70 is in frictional contact with the lower feed roll 68. Thus it will be appreciated that relative speeds of the two pairs of stretch breaking rolls may be varied.

Figure 4:
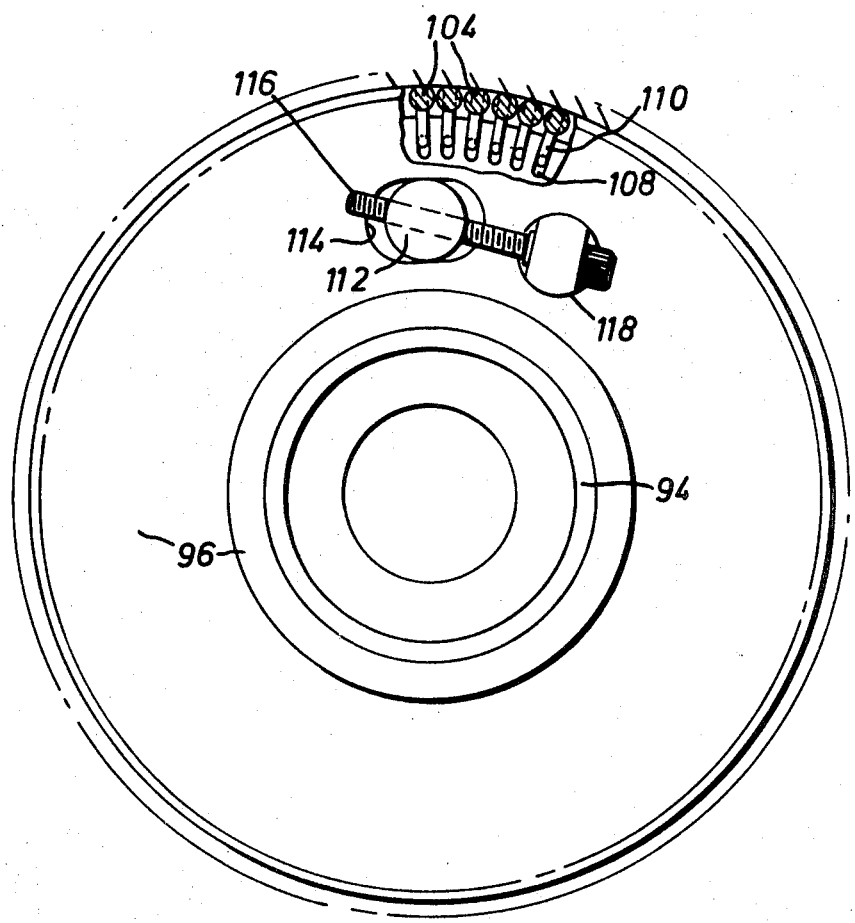
FIG. 4 is an end view, partly in section, of the fibrillating apparatus illustrated in FIGS. 1 to 3.

The fibrillating roll 42 will now be described in more detail with reference to FIGS. 4 and 5 of the accompanying drawings. It consists essentially of a cylindrical support 94, annular end plates 96, 98, intermediate annular support plates 100, 102, pinned rods 104, and means for adjusting the angularity of the pinned rods 104. The manner in which cylindrical support 94, the end plates 96, 98, the support plates 100, 102 and the pinned rods 104 are assembled together will be clear from FIGS. 4 and 5. The means for adjusting the angularity of the pinned rods 104 consists of an auxiliary end plate 106 in the circumference of which are formed a plurality of notches 108 corresponding to the number and spacing of the pinned rods 104. Each pinned rod carries a small cranked lever 110 which as shown is of right-angular configuration, the free end being located in an appropriate notch 108. The auxiliary end plate 106 carries a spigot 112, which extends partly through an elongated hole 114 in the end plate 96. In the end of the spigot 112 beyond the hole 114 is a diametral screw-threaded hole through which passes one end of a screw 116 which is itself at its other end pivotally mounted in a circular hole 118 in the end plate 96. Thus it will be appreciated that if the pinned rods 104 are loosened by slackening mounting screws provided therefor then, by appropriately rotating the screw 116, the spigot 112 and therefore the auxiliary end plate 106 can be caused to rotate by a limited amount, defined by the extent of the hole 114, in either direction. Such rotation will cause simultaneous movement of all the cranked levers 110, corresponding simultaneous angular adjustment of all the pinned rods 104, and therefore simultaneous adjustment of the inclination of all pins.

The fibrillating roll carries 90 pinned rods 104 equi-spaced around its periphery and parallel to its axis, and each rod carries a row of pins at a spacing 34 to the inch. Each pin is ¼ in. long being made from 1.5 mm diam. steel wire with sharpened end. The sizing of the fibrillating roll being described is such that the distance between each successive parallel row of pins is ¼ in. The angular setting of the pinned rods 104 will usually be such that the pins are rearwardly inclined from base to tip at a substantial angle relative to the radial direction, for example at about an inclination of 30°. We prefer to maintain this setting plus or minus 10°, although in many cases a higher inclination, for instance 45° or 50°, may be used without any disadvantage. As has already been stated the successive rows of pins are parallel. The disposition of the pins on successive rods may be such that the pins lie in parallel circumferential columns also. On the other hand the pins in successive rods may be staggered in a selected manner, or be disposed completely at random.

In order that the machinery be flexible in use it is necessary to provide for a number of adjustments. Reference has already been had to some of these, for example the possibility of varying the relative speeds of the input and output nip rolls and the two pairs of stretch breaking rolls to control respectively the tension of the film in the fibrillating zone and the nature of the stretch breaking operation. Within the fibrillating zone three further adjustments are provided. Firstly the electric motor 80 driving the fibrillating roll 42 is a variable speed motor. By adjusting the relative speeds of the roll 42 and the film F coarser or finer fibres and shorter or longer slit dimensions are obtained. Secondly the lay on roll 40 is rotatably adjustable about the axis of the fibrillating roll 42. This is achieved by mounting it at each end in a bracket which is itself rotatably adjustable about the axis of the fibrillating roll 42. By this means the arc of contact of the film F with the pinned periphery of the fibrillating roll 42 may be adjusted and further control over slit length obtained. Thirdly the bars 46, 50 are mounted together for vertical adjustment and the bar 48 is likewise mounted for vertical adjustment. These bars perform a multiple function, namely, to remove the film from the fibrillating roll 42, to guide it away from this roll, to control stray fibres, and to contribute to the control of tension in the fibrillating zone. The effectiveness and nature of these different functions may be varied by adjustment of the two movable bars.

The invention of course is not limited to the particular details of the apparatus or processes hereinbefore particularly described, since numerous modifications will be obvious to a person skilled in the art.

The invention will now be illustrated by way of the following examples.

EXAMPLE 1

Using the machinery just described, an oriented high density polyethylene film 20 microns thick was threaded up through the apparatus and the speed settings of the various drives were arranged to give a throughput of 50 metres per minute, adequate tension in the fibrillating zone, and a speed of rotation of the fibrillating roll 42 which gave it a peripheral speed two and a half times faster than the linear speed of the film, and adequate stretch breaking. The lay on roll 40 was adjusted to give arcuate contact of the film with the fibrillating roll 42 which was 6 in. in extent. The film passing from the fibrillating zone was converted into a highly irregular network with an average fibre denier of 10 and it finally emerged from the stretch breaking zone of the apparatus as a silver like material which was of long staple length, and which may thereafter have been converted into yarn suitable for carpet backing and upholstery fabrics.

It is interesting to note that when processing film at speeds which are economic a highly irregular network is produced by the fibrillating instrumentalities whether the pins lie in parallel rows and columns, or whether they are staggered either regularly or randomly. However, it is possible to control the nature of the network in certain respects and to a limited degree by appropriate selection of the pin pattern and if desired the fibrillating roll 42 may be constructed to allow of axial adjustment of the rods 104.

EXAMPLE 2

A polypropylene having a melt index of 1.59/10 min was extruded to a continuous film at a mass temperature of 230° C using the tubular film extrusion process. The lay flat film having a total thickness of 150 microns and a width of about 30 cm was longitudinally stretched as a whole in a hot air oven at 140° C, using an inlet speed of 7m/min and a stretched ratio of 1 : 8, resulting in an end line speed of 56 m/min.

The stretched film was fibrillated using a fibrillating apparatus having the following characteristics:
diameter : 21 cm
number of needle bars : 90
number of pins per inch bar length : 34
length of pins : 6 mm
needle inclination : 45° C
speed ratio roll periphery vs. film : 2.5

The product obtained was a sliver having few, very irregular interconnections between the individual filaments. Spreading the sliver outwards resulted in dissolving of the structure, giving a substantially hairy multifilament-like fibre. The main filament length was about 10 cm.

Staple fibres were obtained by cutting the sliver to the desired length.

EXAMPLE 3

The sliver obtained in Example 2 was stretch-broken in an in-line stretch-breaking unit by passing the sliver through two sets of nip rolls, the speed of the second pair being slightly higher than the first. Very good staple fibres were obtained.

EXAMPLE 4

The sliver obtained in Example 2 was passed to a gill skinner and subsequently to a twisting machine. A substantially hairy yarn of good bulk and feel was obtained.

What is claimed is:

1. An apparatus suitable for the manufacture of fibrous products which comprises a roll having a plurality of rows of pins projecting from the periphery of said roll, said rows being parallel to the roll axis and containing at least 8 pins per centimeter, said pins, from base to tip, being rearwardly inclined to the direction of the roll radius, a means for rotating said roll at selected peripheral speeds, and a means for causing a film to travel continuously under tension over the periphery of said roll in an arcuate path of an extent which embraces a plurality of rows of pins and at a linear speed less than the peripheral speed of the roll, the surface of said roll being provided with a plurality of grooves of substantially constant cross-section, parallel to the roll axis, each extending over the whole length of the roll and adapted to receive one bar having a cross-section which is substantially constant along its length and lengthwise being provided with at least one substantially straight row of pins by insertion of at least a portion of the bar in a direction parallel to the roll axis, said bar being rotatably adjustable about its axis.

2. An apparatus according to claim 1 wherein said rows of pins are situated at a distance between successive rows ranging from 5 to 10 mm and have a pin density of from 12 to 16 per cm, and said pins have an effective length between 2 and 7 mm and an angle of inclination of from 20° to 50°.

3. An apparatus according to claim 1 wherein said pinned bars are rods having a substantially round cross-section, each provided with one row of pins.

4. An apparatus according to claim 3 which comprises means for varying the inclination of all pins simultaneously.

5. An apparatus according to claim 1 which comprises a lay-on roll in contrarotating and closely spaced relationship with the periphery of said pinned roll, said lay-on roll being rotatably adjustable about the axis of said lay-on roll.

6. An apparatus according to claim 1 which comprises at least one bar in closely spaced relationship with the periphery of said pinned roll, said bar being in fixed but adjustable position parallel to the pinned roll axis.

7. An apparatus according to claim 6 wherein said bars have a substantially rectangular cross-section.

8. An apparatus according to claim 6 wherein said bars are vertically adjustable relative to the axis of said pinned roll.

* * * * *